(12) United States Patent
Hicks et al.

(10) Patent No.: US 11,554,546 B2
(45) Date of Patent: Jan. 17, 2023

(54) HEATED THREE-DIMENSIONAL PRINTER HEAD FOR VARIABLE MATERIAL DEPOSITION

(71) Applicant: International Business Machines Corporation, Armonk, NY (US)

(72) Inventors: Andrew Hicks, Wappingers Falls, NY (US); Miles C. Pedrone, Wappingers Falls, NY (US); Tynan J. Garrett, Poughkeepsie, NY (US); Michael Peter Lyons, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 16/454,383

(22) Filed: Jun. 27, 2019

(65) Prior Publication Data

US 2020/0406541 A1 Dec. 31, 2020

(51) Int. Cl.
| | |
|---|---|
| *B29C 64/209* | (2017.01) |
| *B29C 64/106* | (2017.01) |
| *H05B 6/10* | (2006.01) |
| *B33Y 30/00* | (2015.01) |
| *B33Y 10/00* | (2015.01) |

(52) U.S. Cl.
CPC ......... *B29C 64/209* (2017.08); *B29C 64/106* (2017.08); *H05B 6/10* (2013.01); *B33Y 10/00* (2014.12); *B33Y 30/00* (2014.12)

(58) Field of Classification Search
CPC .............................. B29C 64/106; B29C 64/118
See application file for complete search history.

(56) References Cited

U.S. PATENT DOCUMENTS

| | | | |
|---|---|---|---|
| 6,305,769 B1 | 10/2001 | Thayer et al. | |
| 6,357,855 B1 | 3/2002 | Kerekes et al. | |
| 6,572,807 B1 | 6/2003 | Fong | |

(Continued)

FOREIGN PATENT DOCUMENTS

| | | |
|---|---|---|
| CN | 104626590 B | 2/2017 |
| CN | 106739745 A | 5/2017 |

(Continued)

OTHER PUBLICATIONS

Booth J, Whitley M, Rudd C, and Kranz M (2017) Material Database for Additive Manufacturing Techniques. RDMR-WD-17-64, AMRDEC. Available at https://apps.dtic.mil/sti/pdfs/AD1043719.pdf [Verified Mar. 26, 2022] (Year: 2017).*

(Continued)

*Primary Examiner* — Manley L Cummins, IV
(74) *Attorney, Agent, or Firm* — Cantor Colburn LLP; Teddi Maranzano

(57) ABSTRACT

An additive manufacturing device is provided and includes a printing material source, a printing head and a temperature control system. The printing material source is configured to contain a supply of printing material. The printing head is receptive of the printing material from the printing material source and is configured to print an object with the printing material. The temperature control system is coupled to the printing head and is configured to adjust a temperature of the printing material during printing to cause state changes of the printing material resulting in the printing material being one of soluble and insoluble in a solvent.

7 Claims, 5 Drawing Sheets

T - Temperature

(56) References Cited

U.S. PATENT DOCUMENTS

| | | | |
|---|---|---|---|
| 8,991,211 B1 | 3/2015 | Arlotti et al. | |
| 9,038,422 B2 | 5/2015 | Wanveer | |
| 9,339,972 B2 | 5/2016 | Gordon et al. | |
| 9,868,871 B2 | 1/2018 | Liu et al. | |
| 10,029,937 B2 | 7/2018 | Van Pelt | |
| 2009/0148813 A1 | 6/2009 | Sun et al. | |
| 2012/0231232 A1 | 9/2012 | Xu et al. | |
| 2013/0310507 A1* | 11/2013 | Tummala | C09J 133/08 524/503 |
| 2014/0061974 A1* | 3/2014 | Tyler | B29C 70/384 264/401 |
| 2015/0059409 A1 | 3/2015 | Ravel et al. | |
| 2015/0298393 A1 | 10/2015 | Suarez | |
| 2016/0012935 A1* | 1/2016 | Rothfuss | B33Y 70/00 252/62.54 |
| 2016/0303807 A1 | 10/2016 | Diamante | |
| 2017/0036403 A1* | 2/2017 | Ruff | C09D 109/08 |
| 2017/0043532 A1 | 2/2017 | Carr et al. | |
| 2017/0066194 A1 | 3/2017 | Bromer | |
| 2017/0081236 A1 | 3/2017 | Klein et al. | |
| 2017/0240675 A1 | 8/2017 | Yoshimura | |
| 2017/0255714 A1 | 9/2017 | Yoon et al. | |
| 2018/0162048 A1* | 6/2018 | Gibson | B29C 48/301 |
| 2018/0257303 A1 | 9/2018 | Bostick et al. | |
| 2019/0084861 A1 | 3/2019 | Takahashi et al. | |
| 2019/0091933 A1 | 3/2019 | Barbati et al. | |
| 2020/0370206 A1* | 11/2020 | Dunn | B33Y 70/00 |

FOREIGN PATENT DOCUMENTS

| | | |
|---|---|---|
| WO | 2018002001 A1 | 1/2018 |
| WO | 2018077712 A1 | 5/2018 |

OTHER PUBLICATIONS

Zhong-xiao, Liang. "Synthesis and Properties of Water-Soluble Phenolic Resin Containing Oxidized Tertamine Groups," Journal ofBeijing Institute of Graphic Communication (2008): See, e.g., Abstract (Year: 2008).*

Gonzilez-Henriquez, Carmen Mabel et al., "Antimicrobial Polymers for Additive Manufacturing," Int. J. Mol. Sci., vol. 20(5), 1210, Mar. 10, 2019 (Year: 2019).*

Andreas Bastian, "3D Print Finishing Technique for Improved Surface Quality",2016, online retrieved, URL<http://www.instructables.com/id/3D-Print-Finishing-Technique-for-Improved-Surface-/>,7 pages.

Andrew Liszewski, "A New 3D Printing Support Filament Easily Dissolves Away in Water", Jul. 14, 2015, Retrieved from URL:<https://gizmodo.com/a-new-3d-printing-support-filament-easily-dissolves-awa-1717688742>, 3 pages.

Anonymous (Mar. 2017). The Ultimate Guide to Stereolithography (SLA) 3D Printing. Retrieved from URL<https://formlabs.com/blog/ultimate-guide-to-stereolithography-sla-3d-printing/>, 25 pages.

Dave Evan, "Ultimate Guide to Finishing 3D Printed Parts", Jan. 28, 2017, online retrieved, URL<https//www.fictiv.com/hwg/fabricate/ultimate-guide-to-finishing-3d-printed-parts>, 21 pages.

Disclosed anonymously (Sep. 2014). System and Method to Print Unique Versions of 3D Objects by Dynamically Altering Relative Attributes. IPCOM000238607D, 5 pages.

Heidi Hoopes, "3D-printed materials that change texture on demand", Jun. 12, 2015, Online retrieved, URL<http://newatlas.com/3d-printing-surfaces-texture-dynamic/37985/#gallery>, 2 pages.

Jean Le Bouthillier, "Heat Beds in 3D Printing—Advantages and Equipment", Mar. 13, 2016, URL<http://bootsindustries.com/heat-bed-3d-printing/>, 13 pages.

Klein et al., "3D Printing of Transparent Glass",Hewlett-Packard Development Company, L.P, 2012, 4 pages.

Li et al., "Increasing the functionalities of 3D printed microchemical devices by single material, multimaterial, and print-pause-print 3D printing", Royal Society of Chemistry, Lab Chip, 2019, 19, 35-49.

Sun, et al. "A review on 3D Printing for Customized Food Fabrication", Procedia Manufacturing, 2015, vol. 1, pp. 308-319.

Wang, W., Wang, T. Y., Yang, Z., Liu, L., Tong, X., Tong, W., . . . & Liu, X. (2013). Cost-effective printing of 3D objects with skin-frame structures. ACM Transactions on Graphics (TOG), 32(6), 177.

Whiteclouds, "3D Textures",2016, online retrieved, URL<https://www.whiteclouds.com/3dpedia-index/3d-textures>,2 pages.

Encyclopaedia Britannica (2019) Resin—Chemical Compound. Retrieved from URL<https://www.britannica.com/science/resin>, 2 pages.

* cited by examiner

HEATED THREE-DIMENSIONAL PRINTER HEAD FOR VARIABLE MATERIAL DEPOSITION

BACKGROUND

The present invention generally relates to a three-dimensional printer head, and more specifically, to a heated three-dimensional printer head for variable material deposition.

Additive manufacturing, or three-dimensional (3D) printing, is typically conducted in a 3D printer or another similar device and involves the deposition and curing or hardening of material in patterned layers to form a 3D printed object. Most 3D printers include a housing, a printing bed disposed in the housing, a printing head, nozzle or dispenser that dispenses the material onto the printing bed and then onto subsequent layers, a curing or hardening element that cures or hardens the material and a controller system. The control system controls the position and orientation of the printing head, nozzle or dispenser as well as the position and orientation of the curing or hardening element. In this way, the 3D printed object can be provided with various, oftentimes complex geometries.

SUMMARY

Embodiments of the present invention are directed to an additive manufacturing device. A non-limiting example of the additive manufacturing device includes a printing material source, a printing head and a temperature control system. The printing material source is configured to contain a supply of printing material. The printing head is receptive of the printing material from the printing material source and is configured to print an object with the printing material. The temperature control system is coupled to the printing head and is configured to adjust a temperature of the printing material during printing to cause state changes of the printing material resulting in the printing material being one of soluble and insoluble in a solvent.

Embodiments of the present invention are directed to an additive manufacturing method. A non-limiting example of the additive manufacturing method includes printing an object with printing material and adjusting a temperature of the printing material during the printing to cause state changes of the printing material resulting in the printing material being one of soluble and insoluble in a solvent.

Embodiments of the present invention are directed to an additive manufacturing method. A non-limiting example of the additive manufacturing method includes mixing first and second materials to produce printing material with a melting temperature. The first material is insoluble in a solvent and has a first vaporizing temperature. The second material is soluble in the solvent and has a second vaporizing temperature lower than the first vaporizing temperature and higher than the melting temperature. The non-limiting example of the additive manufacturing method further includes printing first and second portions of an object by dispensing the printing material at first dispensing temperatures, which exceed the melting temperature and are lower than the second vaporizing temperature, and at second dispensing temperatures, which exceed the second vaporizing temperature and are lower than the first vaporizing temperature, respectively Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
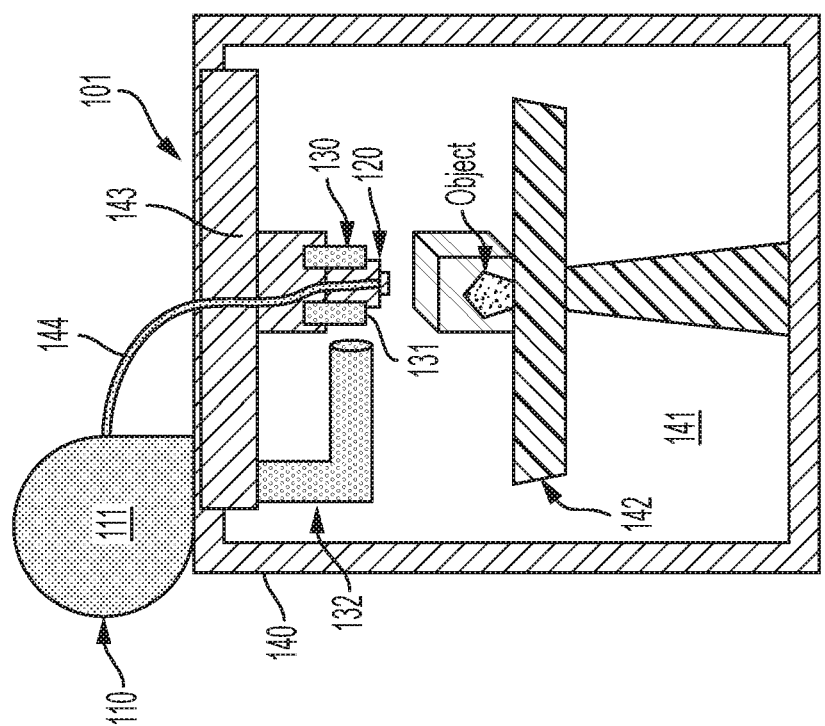
FIG. 1 is a schematic illustration of an additive manufacturing device in accordance with embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

As will be described below, an additive manufacturing device is provided. The additive manufacturing device includes a printing material source, a printing head and a temperature control system. The printing material source contains a supply of printing material. The printing head is receptive of the printing material from the printing material source and is configured to print an object with the printing material. The temperature control system is coupled to the printing head and is configured to adjust a temperature of the printing material during the printing to thereby cause state changes of the printing material during the printing. These state changes result in the printing material being one of soluble (after previously being insoluble) in a solvent and insoluble (after previously being soluble) in a solvent.

In addition, an additive manufacturing method is provided. The additive manufacturing method includes printing an object with printing material and adjusting a temperature of the printing material during the printing to cause state changes of the printing material resulting in the printing material being one of soluble and insoluble in a solvent.

Turning now to an overview of technologies that are more specifically relevant to aspects of the invention, 3D printing can be used for making components of industrial equipment, toys, art, etc. However, due to the nature of 3D printing, objects of low-to-high levels of complexity that do not have a flat base are typically more difficult to balance during the printing. Thus, it is often necessary to provide a balance or an additional feature to support the printed object so that successive layers thereof can be reliably printed on underlying layers.

Over the years, there have been a number of ways to provide balancing or additional features for support. These often employ the use of two or more different types of materials where one of the materials is dissolvable in a chemical and the other is not dissolvable in the chemical. In these or other cases, the use of two or more types of materials leads to further issues that must be resolved including, in particular, the need to connect sources of each of the materials to a single printing head or the use of multiple printing heads. In either case, the complexity of 3D printers can be substantially increased.

Turning now to an overview of the aspects of the invention, one or more embodiments of the invention provide for the additive manufacturing or 3D printing of a complex object without resorting to the use of two or more types of materials.

The above-described aspects of the invention address one or more shortcomings of the prior art by providing for improved additive manufacturing or 3D printing. Instead of using multiple types of materials to allow for the construction of an object, a single material is used. With this single material, its ability to be dissolved or remain solid in a solvent is governed by an increase or a decrease in an amount of heat applied to the single material in the printing head. The increase in temperature evaporates part of the material allowing for only solid plastic to be deposited. At lower temperatures, additional chemicals remain in the material that allow it to easily dissolve in the solvent.

Figure 2:
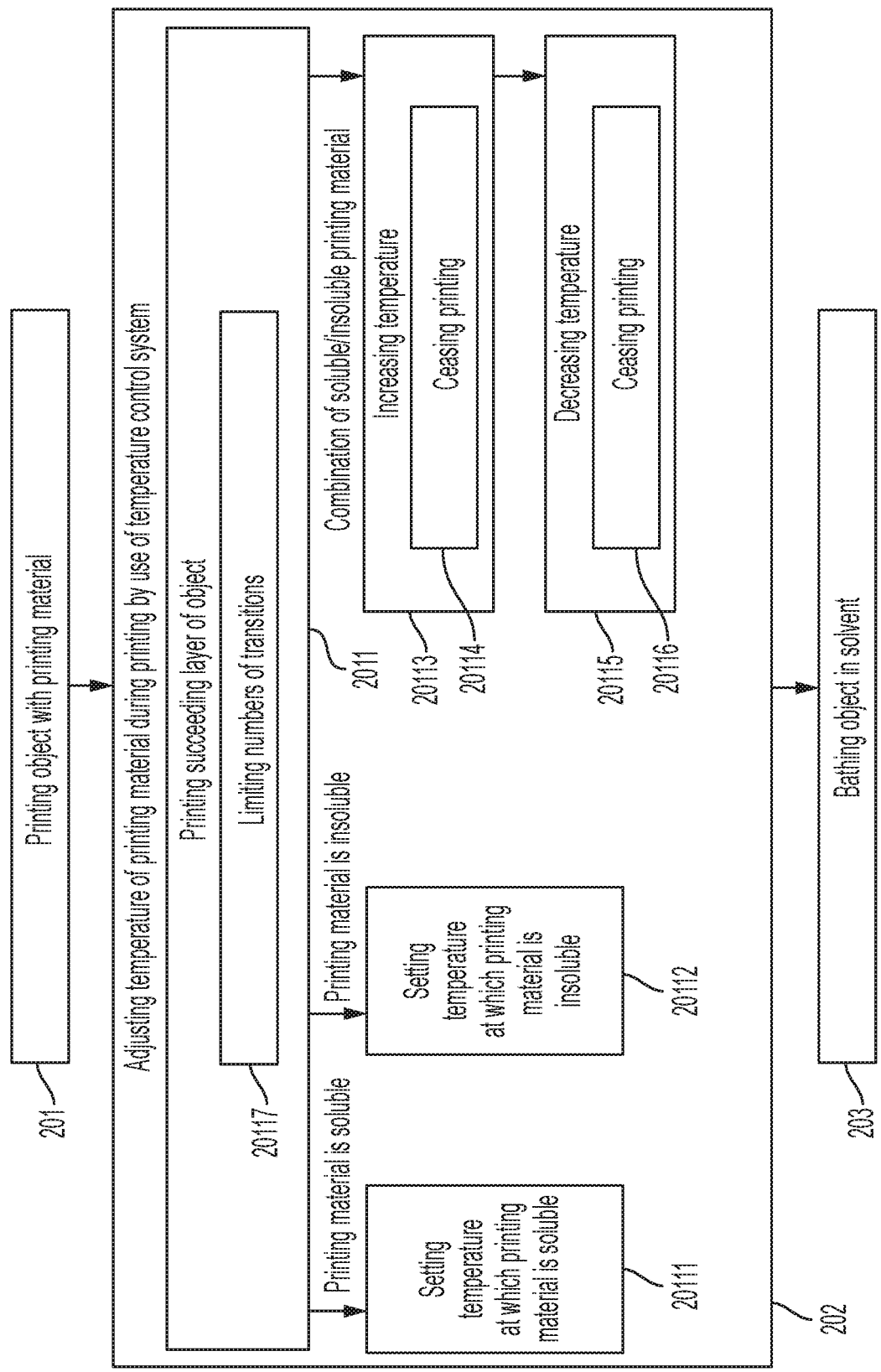
FIG. 2 is a flow diagram illustrating an additive manufacturing method in accordance with embodiments of the present invention.

Turning now to a more detailed description of aspects of the present invention, FIGS. 1 and 2 depict an additive manufacturing device 101 in accordance with one or more embodiments of the present invention. As shown in FIG. 1, the additive manufacturing device 101 includes a printing material source 110 that contains a supply of printing material 111, a printing head 120, which is receptive of the printing material 111 from the printing material source 110 and which is configured to print an object with the printing material 111, and a temperature control system 130. The temperature control system 130 is coupled to the printing head 120 and is configured to adjust a temperature of the printing material 111 during the printing. This temperature adjustment serves to cause state changes of the printing material 111, which result in the printing material 111 being one of soluble and insoluble in a solvent. The temperature control system 130 can include heating elements 131, such as resistive heaters disposed in operable proximity to or in contact with the printing head 120, and cooling elements 132, such as a cooling gun that is disposed in operable proximity to the printing head 120 in order to blow cooling air over the printing head 120.

The printing material 111 can include plastic and optionally a bonding agent. The concentration of the bonding agent in the printing material 111 is largely determinative as to whether the printing material 111 will be or will not be dissolvable in the solvent upon being printed and can be affected by the temperature adjustment as will be discussed below. Thus, to the extent that the printing material 111 is not heated during printing, the bonding agent will be present in the printing material 111 and the object or thing that is printed will be dissolvable in the solvent. By contrast, to the extent that the printing material 111 is heated during printing, the bonding agent will not be present in the printing material 111 and the object or thing that is printed will not be dissolvable in the solvent.

In accordance with embodiments of the present invention, the additive manufacturing device 101 further includes a housing 140 defining an interior 141, a printing bed 142 disposed in the interior 141 and on which the object is printable by the printing head 120 and a track 143 that is configured to support the printing head 120 and to move the printing head 120 throughout the interior 141 relative to the printing bed 142 in multiple directions and with multiple degrees of freedom.

With the housing 140 defining the interior 141, it is to be understood that the printing material source 110 can be disposed inside the interior 141 or, as shown in FIG. 1, at an exterior of the housing 140. In these or other cases, the additive manufacturing device 101 can also include a supply system 144 by which the printing head 120 is coupled to the printing material source 110 for reception of the printing material 111.

With reference to FIG. 2, an additive manufacturing method is provided and is executable by the additive manufacturing device 101 of FIG. 1. As shown in FIG. 2, the additive manufacturing method includes printing an object with the printing material 111 (201) and adjusting a temperature of the printing material 111 during the printing by use of the temperature control system 130 (202) to thereby cause state changes of at least a component of the printing material 111, where these state changes result in the printing material 111 being one of soluble and insoluble in a solvent. The method can further include bathing the object in the solvent (203). As a result of the bathing of operation 203, those portions of the object that are printed with the printing material 111 being dissolvable are dissolved or otherwise removed from those portions of the object that are printed with the printing material 111 being insoluble in the solvent.

In accordance with embodiments, the printing of operation 201 can include printing succeeding layers of the object (2011). Here, each succeeding layer includes one of the following types of layers: a type of layer in which only the printing material 111 that is in a state in which it is soluble in the solvent is present, a type of layer in which only the printing material 111 that is in a state in which it is insoluble in the solvent is present and type of layer in which a combination of the printing material 111 in a state in which it is soluble in the solvent and the printing material 111 in a state in which it is insoluble in the solvent is present.

For the case of a succeeding layer including only the printing material 111 being soluble in the solvent, the printing of the succeeding layer of operation 2011 includes using the temperature control system 130 to set the temperature of the printing material 111 at a temperature at which the printing material 111 is soluble in the solvent during the printing of the printing material 111 by the printing head 120 (20111). Conversely, for the case of a succeeding layer including only the printing material 111 being insoluble in the solvent, the printing of the succeeding layer of operation 2011 includes using the temperature control system 130 to set the temperature of the printing material 111 at a temperature at which the printing material 111 is insoluble in the solvent during the printing of the printing material 111 by the printing head 120 (20112).

For the case of a succeeding layer including the combination of the printing material 111 being soluble and insoluble in the solvent, the printing of the succeeding layer of operation 2011 includes using the temperature control system 130 to increase a temperature of the printing material 111 during the printing of the printing material 111 by the printing head 120 at soluble-to-insoluble printing material transitions within the succeeding layer (20113) and, optionally, ceasing the printing at least during the increasing of the temperature (20114). Conversely, for the case of a succeeding layer including the combination of the printing material 111 being soluble and insoluble in the solvent, the printing of the succeeding layer of operation 2011 includes using the temperature control system 130 to decrease a temperature of the printing material 111 during the printing of the printing material 111 by the printing head 120 at insoluble-to-soluble printing material transitions within the succeeding layer (20115) and, optionally, ceasing the printing at least during the decreasing of the temperature (20116).

To the extent that the printing of each succeeding layer of the object involves setting the printing head 120 at a particular height of the succeeding layer and moving the printing head 120 laterally at that height while printing the printing material 111, for the case of a succeeding layer including the combination of the printing material 111 being soluble and insoluble in the solvent, the printing of the succeeding layer of operation 2011 can further include executing the printing such that numbers of soluble-to-insoluble printing material transitions and such that numbers of insoluble-to-soluble printing material transitions are maintained below predefined limits (20117).

Figure 3:
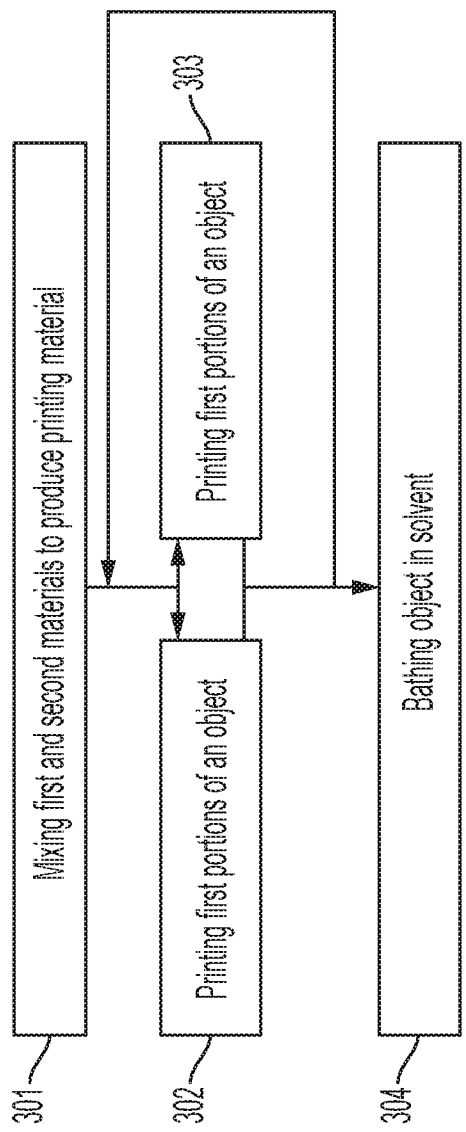
FIG. 3 is a flow diagram illustrating an additive manufacturing method in accordance with embodiments of the present invention.
Figure 4:
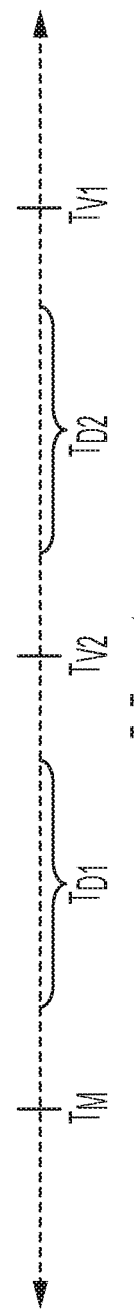
FIG. 4 is a graphical depiction of operational temperatures used during the operations of the additive manufacturing method of FIG. 3 in accordance with embodiments of the present invention.

In accordance with embodiments of the present invention, an additive manufacturing method for use as a particular example of the additive manufacturing method of FIG. 2 will now be described with reference to FIGS. 3 and 4. As shown in FIGS. 3 and 4, the additive manufacturing method includes mixing first and second materials to produce printing material (i.e., the printing material 111) with a melting temperature $T_M$ (301). The first material may be plastic and is insoluble in a solvent and has a first vaporizing temperature $T_{V1}$. The second material can be a bonding agent and is soluble in the solvent and has a second vaporizing temperature $T_{V2}$, which is lower than the first vaporizing temperature $T_{V1}$ and which is higher than the melting temperature $T_M$.

The method further includes printing first portions of an object (302) by dispensing the printing material at first dispensing temperatures $T_{D1}$. The first dispensing temperatures $T_{D1}$ exceed the melting temperature $T_M$ so that the printing material can be dispensed. The first dispensing temperatures $T_{D1}$ are also lower than the second vaporizing temperature $T_{V2}$. As a result, the first portions of the object have both the first material and the second material included therein. These first portions are thus soluble in the solvent.

The method further includes printing second portions of the object (303) by dispensing the printing material at second dispensing temperatures $T_{D2}$. The second dispensing temperatures $T_{D2}$ exceed the melting temperature $T_M$ so that the printing material can be dispensed. The second dispensing temperatures $T_{D2}$ also exceed the second vaporizing temperature $T_{V2}$ and are lower than the first vaporizing temperature $T_{V1}$. As a result, the second portions of the object have the first material included therein since the first material has not been heated sufficiently to vaporize but do not include the second material which has been vaporized. These second portions are thus insoluble in the solvent.

In accordance with further embodiments, the method can also include bathing the object in the solvent (304) to dissolve the second material present in the first portions and to thereby remove the first portions from the second portions.

Figure 5:
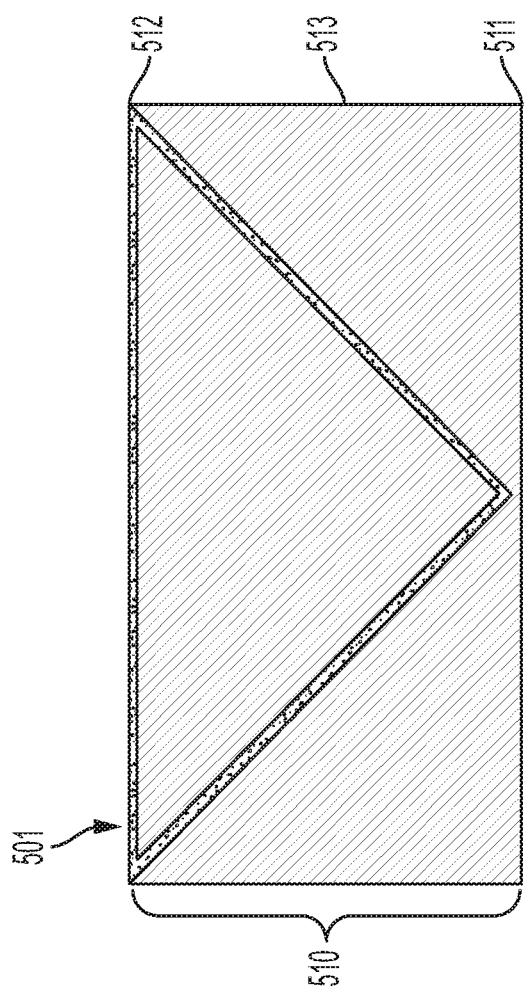
FIG. 5 is a side view of an object that has been additively manufactured in accordance with the additive manufacturing method of FIG. 3 in accordance with embodiments of the present invention.

With continued reference to FIG. 1 and with additional reference to FIGS. 5-9, in order to provide a fuller understanding of the methods of FIGS. 2 and 3, it will be assumed that the object being printed has a tapered and hollow cross-section 501 as shown in FIG. 5 and that the object is printed by the printing of succeeding layers 510 of the object. Each of these succeeding layers 510 thus includes one of the following: a layer in which only sub-portions of the first portions are present as in succeeding layer 511 forming a base of the object (see FIGS. 5 and 6), a layer in which only sub-portions of the second portions are present as in succeeding layer 512 forming a top-most layer of the object (see FIGS. 5 and 7) and a layer in which combinations of the sub-portions of the first portions and the sub-portions of the second portions are present as in succeeding layer 513 forming a mid-level layer of the object (see FIGS. 5, 8 and 9).

Figure 6:
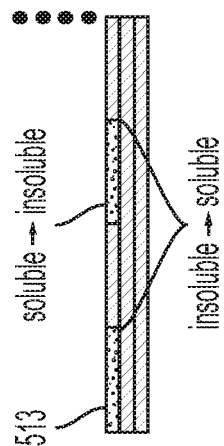
FIG. 6 is a cross-sectional view of a succeeding layer of the object of FIG. 5 in accordance with embodiments of the present invention.

As shown in FIG. 6, the printing of the succeeding layer 511 includes setting the dispensing of the printing material at the first dispensing temperatures $T_{D1}$, setting a height of the printing head 120 at an appropriate height and moving the printing head 120 laterally while executing the printing of the printing material. With the dispensing set at the first dispensing temperatures $T_{D1}$, the succeeding layer 511 will effectively include the first and second materials and will form a sub-portion of the first portions of the object that will be dissolvable in the solvent.

Figure 7:
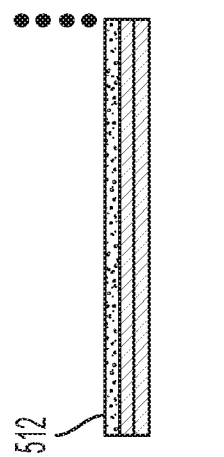
FIG. 7 is a cross-sectional view of a succeeding layer of the object of FIG. 5 in accordance with embodiments of the present invention.

As shown in FIG. 7, the printing of the succeeding layer 512 includes setting the dispensing of the printing material at the second dispensing temperatures $T_{D2}$, setting a height of the printing head 120 at an appropriate height and moving the printing head 120 laterally while executing the printing of the printing material. With the dispensing set at the second dispensing temperatures $T_{D2}$, the succeeding layer 512 will effectively include only the first material and will form a sub-portion of the second portions of the object that will not be dissolvable in the solvent.

Figure 8:
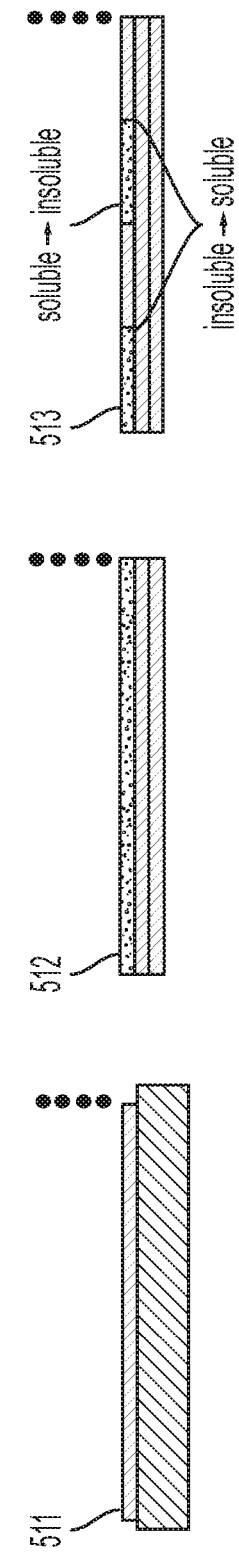
FIG. 8 is a cross-sectional view of a succeeding layer of the object of FIG. 5 in accordance with embodiments of the present invention.

As shown in FIG. 8, the printing of the succeeding layer 513 is more complicated than the processes of FIGS. 6 and 7.

Where the printing of the succeeding layer 513 involves printing a sub-portion of the first portion, printing a sub-portion of the second portion and a transition there-between, the printing of the succeeding layer 513 includes setting the dispensing of the printing material at the first dispensing temperatures $T_{D1}$, setting a height of the printing head 120 at an appropriate height and moving the printing head 120 laterally while executing the printing of the printing material until reaching a location of the transition. At the transition, the printing of the succeeding layer 513 includes increasing the dispensing temperature (i.e., by engaging the heating elements 131 of FIG. 1) until the printing material is at the second dispensing temperatures $T_{D2}$ and, optionally, pausing or ceasing the printing during the increase. Once the second dispensing temperatures $T_{D2}$ are reached, the printing of the succeeding layer 513 further includes moving the printing head 120 laterally away from the location of the transition while resuming the executing of the printing of the printing material. With the dispensing set at the first dispensing temperatures $T_{D1}$ during the approach to the location of the transition, the succeeding layer 513 will effectively include the first and second materials and will form a sub-portion of the first portions of the object that will be dissolvable in the solvent. With the dispensing set at the second dispensing temperatures $T_{D2}$ during the recession away from the location of the transition, the succeeding layer 513 will effectively include only the first material and will form a sub-portion of the second portions of the object that will not be dissolvable in the solvent.

Where the printing of the succeeding layer 513 involves printing a sub-portion of the second portion, printing a sub-portion of the first portion and a transition there-between, the printing of the succeeding layer 513 includes setting the dispensing of the printing material at the second dispensing temperatures $T_{D2}$, setting a height of the printing head 120 at an appropriate height and moving the printing head 120 laterally while executing the printing of the printing material until reaching a location of the transition. At the transition, the printing of the succeeding layer 513 includes decreasing the dispensing temperature (i.e., by engaging the cooling elements 132 of FIG. 1) until the printing material is at the first dispensing temperatures $T_{D1}$ and, optionally, pausing or ceasing the printing during the decrease. Once the first dispensing temperatures $T_{D1}$ are reached, the printing of the succeeding layer 513 further includes moving the printing head 120 laterally away from the location of the transition while resuming the executing of the printing of the printing material. With the dispensing set at the second dispensing temperatures $T_{D2}$ during the approach to the location of the transition, the succeeding layer 513 will effectively include only the first material and will form a sub-portion of the second portions of the object that will not be dissolvable in the solvent. With the dispensing set at the first dispensing temperatures $T_{D1}$ during the recession away from the location of the transition, the succeeding layer 513 will effectively include the first and second materials and will form a sub-portion of the first portions of the object that will be dissolvable in the solvent.

Figure 9:
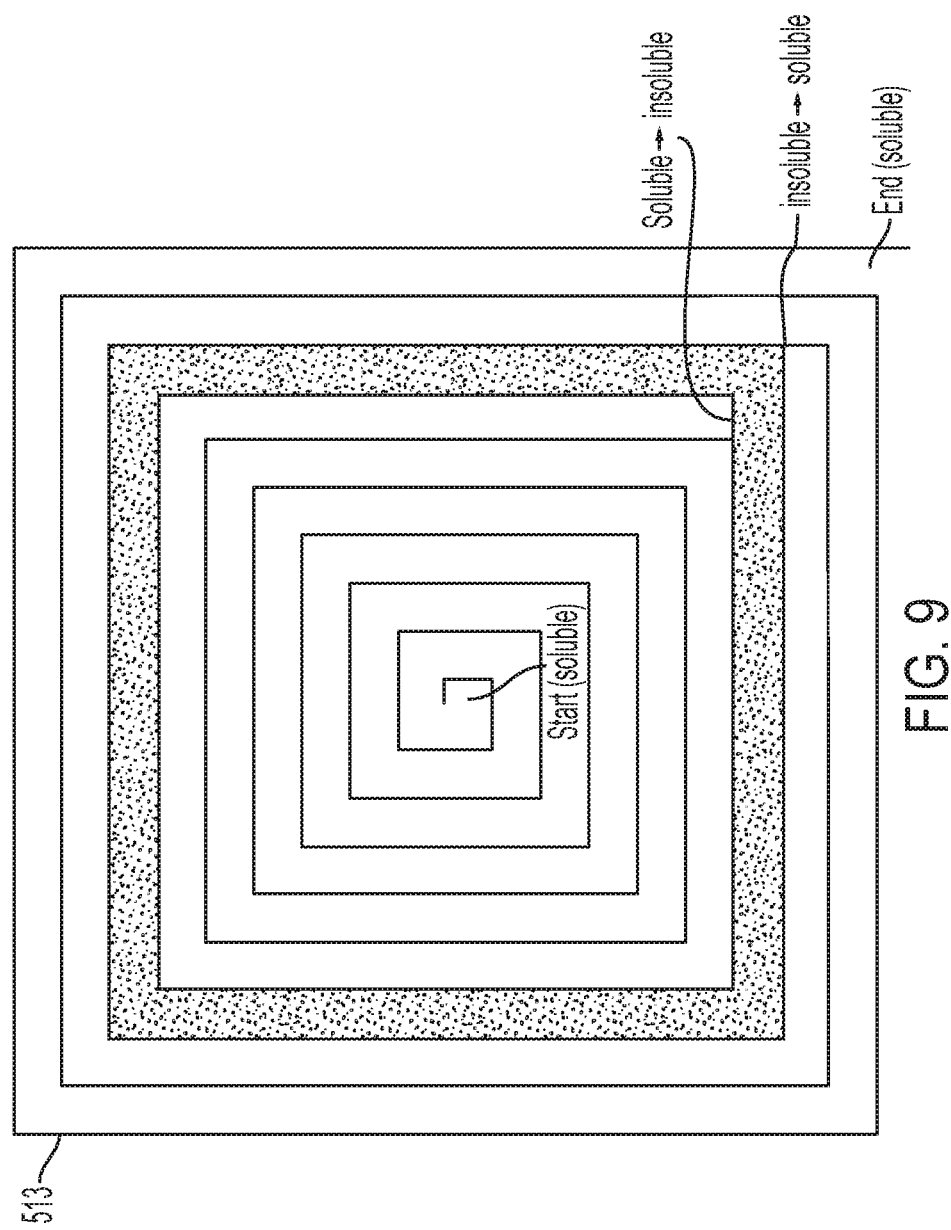
FIG. 9 is a top-down view illustrating a printing path taken during the printing of the succeeding layer of FIG. 8 in accordance with embodiments of the present invention.

As shown in FIG. 9, the printing of the succeeding layer 513 can further include executing the printing such that numbers of transitions from the sub-portions of the first portions to the sub-portions of the second portions and such that numbers of transitions from the sub-portions of the second portions to the sub-portions of the first portions are below predefined limits. For example, instead of moving the printing head 120 in back-and-forth patterns over the entirety of the succeeding layer 513, which would involve up to two transitions from the sub-portions of the first portions to the sub-portions of the second portions and up to two transitions from the sub-portions of the second portions to the sub-portions of the first portions for each pass, the printing head 120 can be moved in a spiralized pattern. In this case, the spiralized pattern can begin in a center of the succeeding layer 513 and proceed outwardly whereby there would only be a need for one single transition from the sub-portions of the first portions to the sub-portions of the second portions and one single transition from the sub-portions of the second portions to the sub-portions of the first portions for each pass.

In accordance with embodiments, the additive manufacturing device 101 can also include a control or processing system. This control or processing system can include a processing unit, a memory unit, a servo control unit that can operate the various components of the additive manufacturing device 101 in accordance with commands issued by the processing unit, a networking unit by which the processing unit is communicative with external systems and an input/output (I/O) bus by which the processing unit, the memory unit, the servo control unit and the networking unit are communicative. The memory unit has executable instructions stored thereon which are readable and executable by the processing unit. When the executable instructions are read and executed by the processing unit, the executable instructions cause the processing unit to at least generate and issue the commands to the servo control unit.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An additive manufacturing method, comprising:
   providing a printing material source configured to contain a supply of printing material, the printing material comprising mixed first and second materials, wherein the first material comprises plastic and the second material comprises a bonding agent, the first material being insoluble in a solvent and the second material being soluble in the solvent;
   providing a printing head receptive of the printing material from the printing material source and configured to print an object with the printing material;
   providing a temperature control system coupled to the printing head and configured to adjust a dispensing temperature of the printing material during printing to cause state changes of the printing material resulting in the printing material being one of soluble and insoluble in the solvent;

printing, from the printing head, first portions of the object by dispensing the printing material at first dispensing temperatures at which the printing material is insoluble in the solvent; and printing, from the printing head, second portions of the object by dispensing the printing material at second dispensing temperatures at which the printing material is soluble in the solvent.

2. The additive manufacturing method according to claim 1, wherein:

the printing of the first and second portions of the object comprises printing succeeding layers of the object, and each succeeding layer comprises one of:
only sub-portions of the first portions;
only sub-portions of the second portions; and
combinations of the sub-portions of the first portions and the sub-portions of the second portions.

3. The additive manufacturing method according to claim 2, wherein:

the printing of each succeeding layer comprising only the sub-portions of the first portions comprises setting the dispensing of the printing material at the first dispensing temperatures, and the printing of each succeeding layer comprising only the sub-portions of the second portions comprises setting the dispensing of the printing material at the second dispensing temperatures.

4. The additive manufacturing method according to claim 2, wherein:

the printing of each succeeding layer comprising the combinations of the sub-portions of the first portions and the sub-portions of the second portions comprises increasing a temperature at which the printing material is dispensed at transitions from the sub-portions of the first portions to the sub-portions of the second portions, and the printing of each succeeding layer comprising the combinations of the sub-portions of the first portions and the sub-portions of the second portions comprises decreasing a temperature at which the printing material is dispensed at transitions from the sub-portions of the second portions to the sub-portions of the first portions.

5. The additive manufacturing method according to claim 4, wherein:

the printing of each succeeding layer comprising the combinations of the sub-portions of the first portions and the sub-portions of the second portions further comprises ceasing the printing until the second dispensing temperatures are reached at transitions from the sub-portions of the first portions to the sub-portions of the second portions, and the printing of each succeeding layer comprising the combinations of the sub-portions of the first portions and the sub-portions of the second portions further comprises ceasing the printing until the first dispensing temperatures are reached at transitions from the sub-portions of the second portions to the sub-portions of the first portions.

6. The additive manufacturing method according to claim 2, wherein the printing of each succeeding layer comprising the combinations of the sub-portions of the first portions and the sub-portions of the second portions comprises executing the printing such that numbers of transitions from the sub-portions of the first portions to the sub-portions of the second portions and of transitions from the sub-portions of the second portions to the sub-portions of the first portions are below predefined limits.

7. The additive manufacturing method according to claim 1, further comprising bathing the object in the solvent to dissolve the second material present in the first portions to thereby remove the first portions from the second portions.

* * * * *